(12) United States Patent
Xu et al.

(10) Patent No.: US 7,173,713 B2
(45) Date of Patent: Feb. 6, 2007

(54) OPTICAL FIBER SENSORS FOR HARSH ENVIRONMENTS

(75) Inventors: Juncheng Xu, Blacksburg, VA (US); Anbo Wang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 222 days.

(21) Appl. No.: 10/791,842

(22) Filed: Mar. 4, 2004

(65) Prior Publication Data
US 2005/0195403 A1   Sep. 8, 2005

(51) Int. Cl.
*G01B 9/02* (2006.01)
*G02B 6/00* (2006.01)

(52) U.S. Cl. ......................... 356/480; 385/12
(58) Field of Classification Search ............. 356/35.5, 356/477, 478, 480, 519; 250/227.19, 227.27; 385/12
See application file for complete search history.

(56) References Cited

U.S. PATENT DOCUMENTS

| | | | |
|---|---|---|---|
| 4,711,246 A | 12/1987 | Alderson | |
| 4,711,521 A | 12/1987 | Thillays | |
| 4,861,136 A * | 8/1989 | Stone et al. | 356/480 |
| 4,873,989 A | 10/1989 | Einzig | |
| 4,884,450 A | 12/1989 | Greenwood et al. | |
| 5,202,939 A * | 4/1993 | Belleville et al. | 385/12 |
| 5,301,001 A | 4/1994 | Murphy et al. | |
| 5,337,377 A | 8/1994 | Yamada et al. | |
| 5,359,405 A * | 10/1994 | Andrews | 356/35.5 |
| 5,381,229 A * | 1/1995 | Murphy et al. | 356/477 |
| 5,452,087 A * | 9/1995 | Taylor et al. | 356/480 |
| 5,844,236 A * | 12/1998 | Wilson | 250/227.19 |
| 5,870,511 A * | 2/1999 | Sawatari et al. | 385/12 |
| 6,069,686 A | 5/2000 | Wang et al. | |
| 6,120,193 A | 9/2000 | Luther et al. | |
| 6,317,555 B1 | 11/2001 | Maron et al. | |

(Continued)

FOREIGN PATENT DOCUMENTS

JP    7260617    10/1995

(Continued)

OTHER PUBLICATIONS

Yu, et al., "Fiber Fabry-Perot Sensors for Detection of Partial Discharges In Power Transformers", Applied Optics, vol. 42, No. 16, Jun. 2003.

*Primary Examiner*—Gregory J. Toatley, Jr.
*Assistant Examiner*—Patrick Connolly
(74) *Attorney, Agent, or Firm*—DLA Piper US LLP

(57) ABSTRACT

A diaphragm optic sensor comprises a ferrule including a bore having an optical fiber disposed therein and a diaphragm attached to the ferrule, the diaphragm being spaced apart from the ferrule to form a Fabry-Perot cavity. The cavity is formed by creating a pit in the ferrule or in the diaphragm. The components of the sensor are preferably welded together, preferably by laser welding. In some embodiments, the entire ferrule is bonded to the fiber along the entire length of the fiber within the ferrule; in other embodiments, only a portion of the ferrule is welded to the fiber. A partial vacuum is preferably formed in the pit. A small piece of optical fiber with a coefficient of thermal expansion chosen to compensate for mismatches between the main fiber and ferrule may be spliced to the end of the fiber.

14 Claims, 3 Drawing Sheets

U.S. PATENT DOCUMENTS

| | | |
|---|---|---|
| 6,539,135 B1 | 3/2003 | Canning et al. |
| 6,539,136 B1 | 3/2003 | Dianov et al. |
| 6,671,055 B1 | 12/2003 | Wavering et al. |
| 6,738,145 B2 * | 5/2004 | Sherrer et al. .............. 356/480 |
| 6,820,488 B2 * | 11/2004 | Lenzing et al. ............... 385/12 |
| 6,901,176 B2 * | 5/2005 | Balachandran et al. ....... 385/12 |
| 2003/0209655 A1 | 11/2003 | Wang |

FOREIGN PATENT DOCUMENTS

| | | |
|---|---|---|
| JP | 2002349336 | 12/2002 |
| WO | WO 90/08962 | 8/1990 |
| WO | WO 99/60341 | 11/1999 |

* cited by examiner

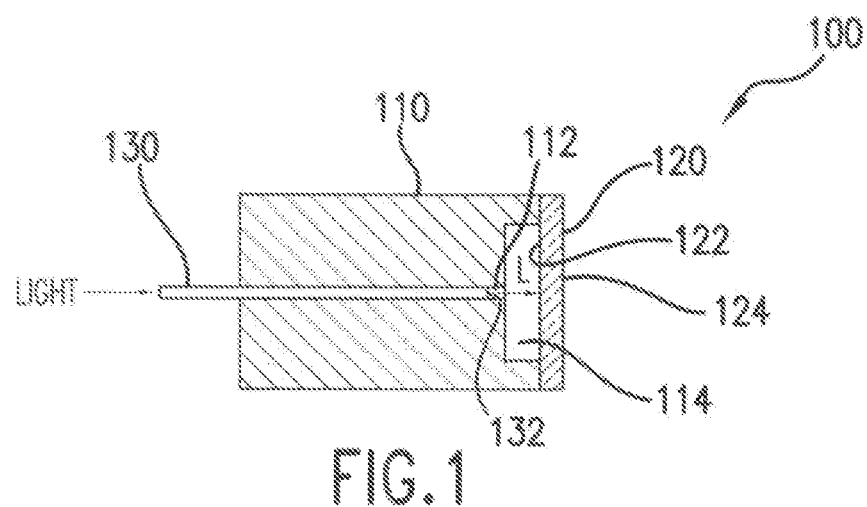
FIG. 1
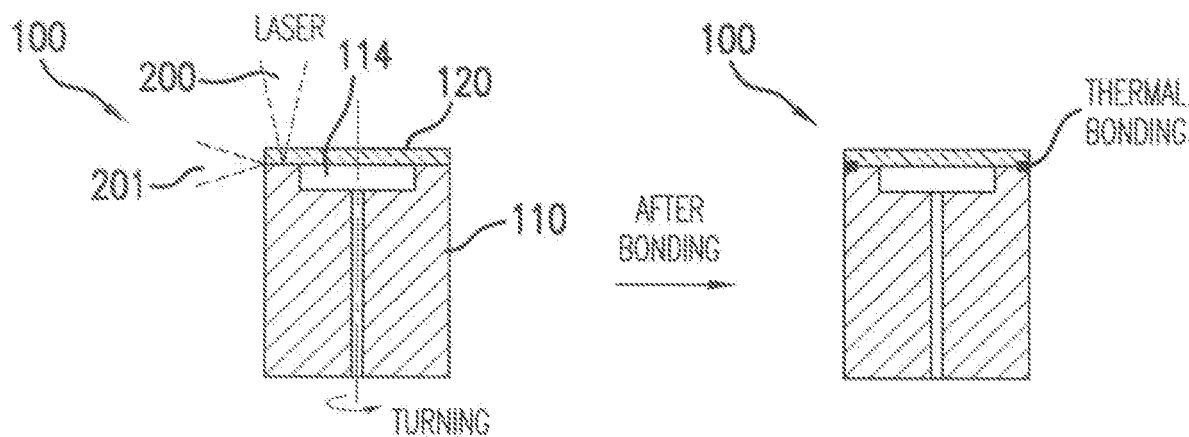
FIG. 2a
FIG. 2b

OPTICAL FIBER SENSORS FOR HARSH ENVIRONMENTS

This invention was partially made with Government support under grant number DEFC3601G01050 awarded by the U.S. Department of Energy. The Government may have certain rights in the invention.

BACKGROUND OF THE INVENTION

1. Field of the Invention

The invention relates to optical sensors generally, and more particularly to Fabry-Perot cavity sensors.

2. Discussion of the Background

Optical sensors are used in a wide variety of applications. They offer advantages as compared to other types of sensors, including small size, immunity to electromagnetic interference (EMI), extreme stability, long life, high temperature operation, and low cost. They are especially useful in harsh environments, including high temperature, high pressure environments.

One type of optical sensor is the diaphragm-based Fabry-Perot sensor. In such sensors, a Fabry-Perot cavity is formed between an end of an optical fiber and a reflective diaphragm. Two reflections occur in these sensors: a first reflection between the glass/air interface at the end of the fiber, and a second reflection that occurs at the surface of the diaphragm facing the end of the fiber. If the coherence length of the light source exceeds twice the length of the cavity, observable interference between the two reflections occurs. Deflections of the diaphragm due to a pressure applied to the diaphragm result in changes to the cavity length, which result in corresponding changes in the interference pattern from the two reflections. Some of these sensors are designed such that movement of the diaphragm (and corresponding changes to the cavity length) are constrained to a linear portion of a fringe. This is done to simplify the processing of the signal returned by the sensor.

Diaphragm-based sensors are often formed by attaching an optical fiber to a capillary tube or ferrule (usually glass or silica) and attaching the diaphragm to the tube or ferrule. An example of such a diaphragm based Fabry-Perot sensor is disclosed in U.S. Pat. No. 6,539,135 to Dianov et al. It is typical to use an epoxy to form the attachments between the fiber and ferrule/tube and between the ferrule/tube and the diaphragm in such sensors. However, the use of viscoelastic materials such as epoxies subjects the sensor to time dependent changes, thereby compromising the reproducibility and operation of the sensor. In addition, the use of viscoelastic materials increases the temperature dependence of the sensor.

PCT Publication No. WO 99/60341 discloses diaphragm-based Fabry-Perot sensors formed by a fiber surrounded by a ferrule/tube and a silicon wafer with a portion etched away to form a Fabry-Perot cavity. Several different methods for attaching the components of the sensors are disclosed. WO 99/60341 discloses bonding a fiber to a capillary tube using epoxy. In order to minimize thermal drifts, WO 99/60341 discloses attaching the fiber to the front end of the ferrule/tube locally by heating the capillary with a laser or local heating element and allowing the capillary to collapse along a limited section of up to a few millimeters of the fiber. In such embodiments, a flexible adhesive is used to bond the fiber to the ferrule/tube to allow for movement to alleviate stresses from thermal mismatches between the fiber and tube/ferrule. Applicants have experimented with such a procedure but the mechanical bond between the collapsed portion of the capillary tube and the fiber that results from this process has proven unsatisfactory. WO 99/60341 also discloses using solder glass to adhere the fiber to the ferrule/tube, but does not explain how thermal mismatches between the tube/ferrule and the fiber are accommodated. With respect to the bonding of the diaphragm to the ferrule/tube, WO 99/60341 discloses using adhesives, anodic bonding and diffusion bonding. The techniques disclosed in WO 99/60341 are an improvement over the use of epoxies, but are not ideal.

BRIEF SUMMARY OF THE INVENTION

The present invention addresses the aforementioned issues to a great extent by providing a diaphragm fiber optic sensor comprising a cylindrical ferrule including a central bore, and a diaphragm attached to the cylindrical ferrule. In some embodiments, the Fabry-Perot cavity is formed by mechanically machining or chemically etching the ferrule. In other embodiments, the Fabry-Perot cavity is formed by mechanically machining or chemically etching the diaphragm.

In one aspect of the invention, bonds between the ferrule and fiber and diaphragm and ferrule are formed by welding the ferrule to the fiber and the diaphragm to the ferrule. The welding may be accomplished by any means (e.g., electric arc), but is preferably accomplished with a laser. In some embodiments, the entire ferrule is bonded to the fiber along the entire length of portion of the fiber that is within the ferrule. In other embodiments, particularly those embodiments in which there is a mismatch in the coefficients of thermal expansion of the ferrule and fiber (which may result from the presence of dopants in the fiber but not in the ferrule, or differences in the types or amounts of dopants in the fiber and ferrule), only a small portion of the fiber is welded to the ferrule to provide for small amounts of relative movement between the fiber and ferrule in the non-welded areas to accommodate movement due to thermal expansion and contraction. Using welding has the added advantage of driving air out of the cavity between the ferrule and diaphragm, which decreases the temperature dependence of the sensor.

In another aspect of the invention, both the front and rear surfaces of the diaphragm are polished and a second Fabry-Perot cavity, formed by the glass/air interfaces at the front and rear surfaces of the diaphragm, are used to measure temperature independently of pressure. The temperature reading may be used to compensate the output of the first Fabry-Perot cavity formed by the gap between the diaphragm and the end of the optical fiber.

In still another aspect of the invention, a small piece of optical fiber is spliced to an end of the main fiber to reduce or eliminate the temperature dependence of the sensor. The ferrule is laser welded to the main optical fiber, while the small piece of optical fiber is not attached to the ferrule. When the sensor is subjected to high temperatures, any air remaining in recess between the diaphragm and ferrule will expand, causing the diaphragm to deflect outward. The outward deflection of the diaphragm changes the length of the Fabry-Perot cavity between the end of the fiber and the diaphragm. The small piece of optical fiber is chosen to have a coefficient of thermal expansion such that the small piece of optical fiber will expand in an amount equal a distance that the diaphragm will deflect at elevated temperatures. Any differences between the coefficients of thermal expansion of the ferrule and the main optical fiber can also be compensated for by the small piece of optical fiber. Thus, for example, if the ferrule has a coefficient of thermal expansion that is greater than that of the main fiber, the small piece of optical fiber is chosen to have a coefficient of thermal expansion greater than both the ferrule and the main fiber. This allows the small piece of optical fiber to expand a greater amount than the ferrule in the presence of an elevated temperature to balance the lower amount of thermal expansion of the main fiber relative to the ferrule.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein:

FIG. 1 is a cross sectional view of a sensor according to one embodiment of the invention.

FIG. 2 is a cross sectional view illustrating laser welding of the diaphragm and ferrule of the sensor of FIG. 1 according to an embodiment of the present invention.

DETAILED DESCRIPTION

Figures 3A, 3B:
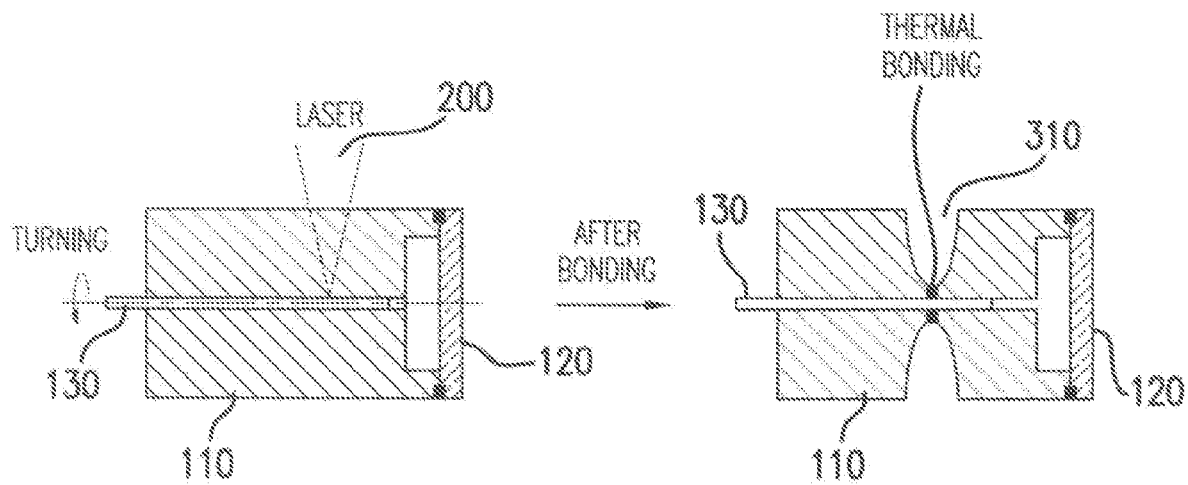
FIG. 3 is a cross sectional view illustrating laser welding of the ferrule and the fiber of the sensor of FIG. 1 according to an embodiment of the invention.

The present invention will be discussed with reference to preferred embodiments of diaphragm sensors. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

A cross sectional view of a diaphragm sensor 100 according to one embodiment of the invention is illustrated in FIG. 1. The sensor includes a ferrule 110 in which a central bore 112 is formed. A pit, or recess, 114 is formed in one end of the ferrule 110. A diaphragm 120 is attached to the ferrule 110 to cover the pit 114. An optical fiber 130 is disposed within the central bore 112. The ferrule 110, diaphragm 120 and optical fiber 130 may be formed from a wide variety of materials (doped or undoped), including silica, glass and/or crystal materials.

The optical fiber end 132 and the inside surface 122 of the diaphragm form a Fabry-Perot cavity with a length L. When light with a coherence length greater than twice the length L of the cavity is launched into the optical fiber 130, light reflected back into the fiber 130 at the air/glass interfaces at the fiber end 132 and at the diaphragm inside surface 122 interferes due to the phase difference resulting from the difference in optical path lengths between the two reflections. When the diaphragm 120 is deformed to due a force (e.g., a pressure) applied to the outside surface 124 of the diaphragm 120, the cavity length L changes, which results in corresponding changes in interference between the two reflections. Thus, by measuring changes in observed interference between the reflections, the corresponding force acting on the diaphragm 120 can be calculated from a knowledge of the mechanical properties of the diaphragm.

Fabrication of the sensor 100 will be discussed with reference to FIGS. 2 and 3. The pit 114 is preferably formed in the ferrule 110 by chemically etching or micro-machining the ferrule 110, but may be formed by any other method. The diameters of the pit 114, the ferrule 110, and the diaphragm 120, and the thickness of the diaphragm 120, are chosen based on the amount of force that is to be exerted on the diaphragm by the measured, the choice of materials for the diaphragm 120 and the ferrule 110, and the desired amount of change in cavity length resulting from such force (as will be described in greater detail below, in some embodiments of sensor systems referred to as linear interferometric sensor systems, it is desirable to fabricate the sensor such that the change in cavity length resulting from changes in the measured is constrained to a linear portion of a single interference fringe).

Next, the diaphragm 120 is attached to the ferrule 110 to cover the pit 114. This is preferably accomplished by laser welding the diaphragm 120 to the ferrule 110. Referring now to FIGS. 2a and 2b, the ferrule 110 is rotated relative to a laser beam, which may be a laser beam 200 directed toward the top of the diaphragm 120 or may be a side-oriented laser beam 201 directed toward the boundary of the ferrule 110 and diaphragm 120. The laser beam 200, 201 is of sufficient strength to locally melt the diaphragm 120 and the ferrule 110 so that the two are welded, or fused, together. The side-oriented laser beam 201 is useful when transmitting a laser beam through the top of the diaphragm is problematic, e.g., when the diaphragm is thick or has a high coefficient of thermal expansion or when the diaphragm surface or the ferrule end surface has high reflectivity for the laser (which means that the power absorptivity is low).

Next, the fiber 130 is inserted into the central bore 114 of the ferrule 110 and the fiber 130 and ferrule 110 are welded together by laser 200. Relative rotation between the laser beam 200 and the ferrule 110 is provided in some embodiments as shown in FIG. 3a. In other embodiments, the laser beam 200 is divided such that it impacts the ferrule at two or more locations (not shown in FIG. 3a). If the ferrule is thick, it may be necessary to ablate a portion 310 of the ferrule 110 as shown in FIG. 3b prior to welding the ferrule 110 to the fiber 130. Welding the fiber 130 to the ferrule 110 provides the advantage (relative to other methods of bonding the fiber to the ferrule, such as the use of epoxy) of creating a partial vacuum in the pit 114 due to the high heat (e.g., 1500° C.) used in the welding process. The partial vacuum is created because the air in the pit 114 expands under high pressure during welding, forcing some of the air out. After the welding creates an air-tight seal between the ferrule 110 and fiber 130, the remaining air in the pit 114 contracts, thereby creating a partial vacuum (the bond between the ferrule 110 and diaphragm 120 is also airtight). This partial vacuum makes the sensor 100 less sensitive to temperature because, at elevated temperatures, the air remaining in the pit 114 will not exert as much force on the diaphragm 120 as it would if some of the air had not been driven out during the welding process.

In some embodiments, the fiber 130 is welded to the ferrule 110 along only a small portion of the length of the ferrule 110 as shown in FIG. 3. In other embodiments, the fiber 130 is welded to the ferrule 110 along the entire length of the ferrule 110. In embodiments of the invention that are not exposed to high temperatures, an epoxy may be used in place of welding.

In a preferred method of manufacturing the sensor 100, the fiber 130 is connected to a light source through a 2×2 coupler and the interference pattern of the reflections from the Fabry-Perot cavity are monitored while the fiber 130 is positioned in the ferrule prior to welding. Additionally, applicants have discovered that the length of the cavity (i.e., the distance between the inside surface 122 of diaphragm 120 and the end 132 of the fiber 130) changes during the laser welding process. In particular, applicants have discovered that the length of the cavity increases when using the laser to weld the fiber and the ferrule, and the length of the cavity decreases when welding the diaphragm to the ferrule. The reasons for these change in cavity length are not entirely clear, although it is believed that one of the factors that contributes to the change in cavity length that occurs during the process of welding the fiber 130 to the ferrule 110 results from the fact that the laser heats the ferrule 110 more rapidly than the fiber 130, thereby causing the ferrule 110 to expand more rapidly than the fiber 130.

Applicants have also learned that the amount of change in the cavity length can be controlled by adjusting the peak power, pulse width and number of pulses of the laser used for the welding process. Applicants have observed that the amount of increase in the cavity length gets larger as the peak power, pulse width, and number of pulses used when welding the fiber to the ferrule are increased. This is true regardless of what portion of the ferrule is welded to the fiber. Similarly, as the peak power, pulse width, and number of pulses used when welding the diaphragm to the ferrule are increased, the amount of decrease in the cavity length gets larger. However, for certain materials, the direction of the changes in cavity length may be opposite those described herein.

It should be noted that, in some embodiments, the fiber and ferrule are rotated during the welding process such that the laser is applied evenly around the circumference of the ferrule. In such embodiments, the rate at which the fiber and ferrule are rotated is adjusted to match changes in the pulse width (e.g., the rotation rate of the fiber/ferrule is adjusted such that the fiber/ferrule makes one complete rotation during a pulse). Of course, it is also possible to move the laser around the circumference of the fiber/ferrule during the manufacturing process.

Therefore, in one method of manufacturing a sensor, the fiber 130 is positioned at a location in the ferrule 110 (e.g., by using a micro-positioning tool) at a location at a distance from a desired final location, and the peak power, pulse width and number of pulses of the laser are controlled so as to cause the cavity length to change to the desired cavity length. In this method, either the ferrule 110 and fiber 130 or the diaphragm 120 and ferrule 110 can be welded first. In a second method, the reflections from the sensor 100 are converted to an electrical signal (e.g., by using a photodetector) and a feedback circuit is constructed to control the laser peak power and/or pulse width such that the cavity length is changed by a desired amount. Although discussed in connection with the sensor 100, it should be understood that these manufacturing techniques are applicable to all sensors discussed herein.

Figure 4:
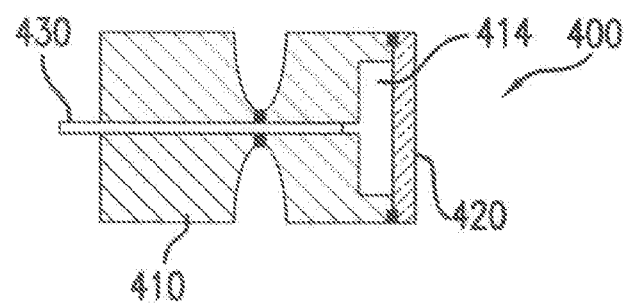
FIG. 4 is a cross sectional view of a sensor according to a second embodiment of the invention.

A sensor 400 according to an alternative embodiment of the invention is illustrated in FIG. 4. The principal difference between the sensor 100 of FIG. 1 and the sensor 400 of FIG. 4 is that the pit 414 of the sensor 400 is formed in the diaphragm 420 rather than the ferrule 410. The pit 414 in the diaphragm 420 may be formed by machining, chemical etching, or any other method. The bonds between the ferrule 410 and diaphragm 420, and the ferrule 410 and fiber 430, may be formed in the same manner as described above.

Each of the above-described sensors is preferably fabricated using laser welding to bond components of the sensor to each other. In alternative embodiments, solder glass, glass sealants, or other materials are used in place of laser welding.

Figure 5:
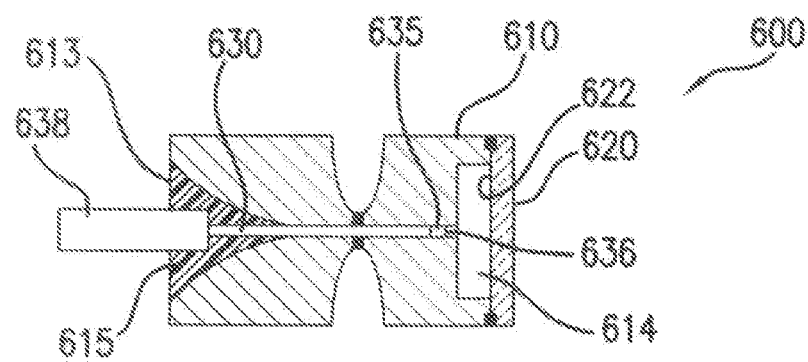
FIG. 5 is a cross sectional view of a diaphragm sensor according to a fourth embodiment of the invention.

Further improvements to the above-discussed sensors are illustrated in the sensor 600 of FIG. 5. The sensor 600 has a pit 614 formed in the ferrule 610 in the manner described in connection with FIGS. 2 and 3, but it should be understood that the improvements discussed in connection with the sensor 600 are equally applicable to diaphragm sensors with a pit formed in the diaphragm such as the sensor 400 of FIG. 4.

One improvement illustrated in FIG. 5 is the addition of a small piece of optical fiber 635 spliced to the end of the fiber 630. In this embodiment, the end 636 of the optical fiber 635 and the inner surface 622 of the diaphragm 620 form the Fabry-Perot cavity. The small piece of optical fiber 635 is made of a material chosen to have a coefficient of thermal expansion to compensate for changes in the length of the cavity at high temperatures. As discussed above, these changes in cavity length may be caused by deflection of the diaphragm 620 by the expansion of air in the space between the diaphragm 620 and the ferrule 610, as well as a mismatch in coefficients between the main fiber 630 and the ferrule 610. For example, if the ferrule 610 has a coefficient of thermal expansion that is greater than that of the main fiber 630, the small piece of optical fiber 635 is made of a material that has a coefficient of thermal expansion greater than both the ferrule 610 and the main fiber 630 to compensate for the mismatch between the ferrule 610 and fiber 630 and deflection of the diaphragm 620 caused by the expansion of air in the pit 614. By properly choosing materials and lengths, it is possible to greatly reduce and even eliminate any temperature dependence of the sensor 600.

A second improvement in the sensor 600 is the provision of a fluted opening 613 in the ferrule 610 that allows a coating 638 placed over the fiber 630 to be extend into the ferrule 610. The fluted opening 613 is preferably filled with an epoxy, sol-gel, or spin-on-glass 615, which bonds to both the walls of the opening 613 of the ferrule 610 and the coating 638 on the fiber. This provides strain relief for the fiber 630, thereby making the sensor 600 more rugged. Of course, these materials must be suitable for the environment in which the sensor is to be used.

Figure 6:
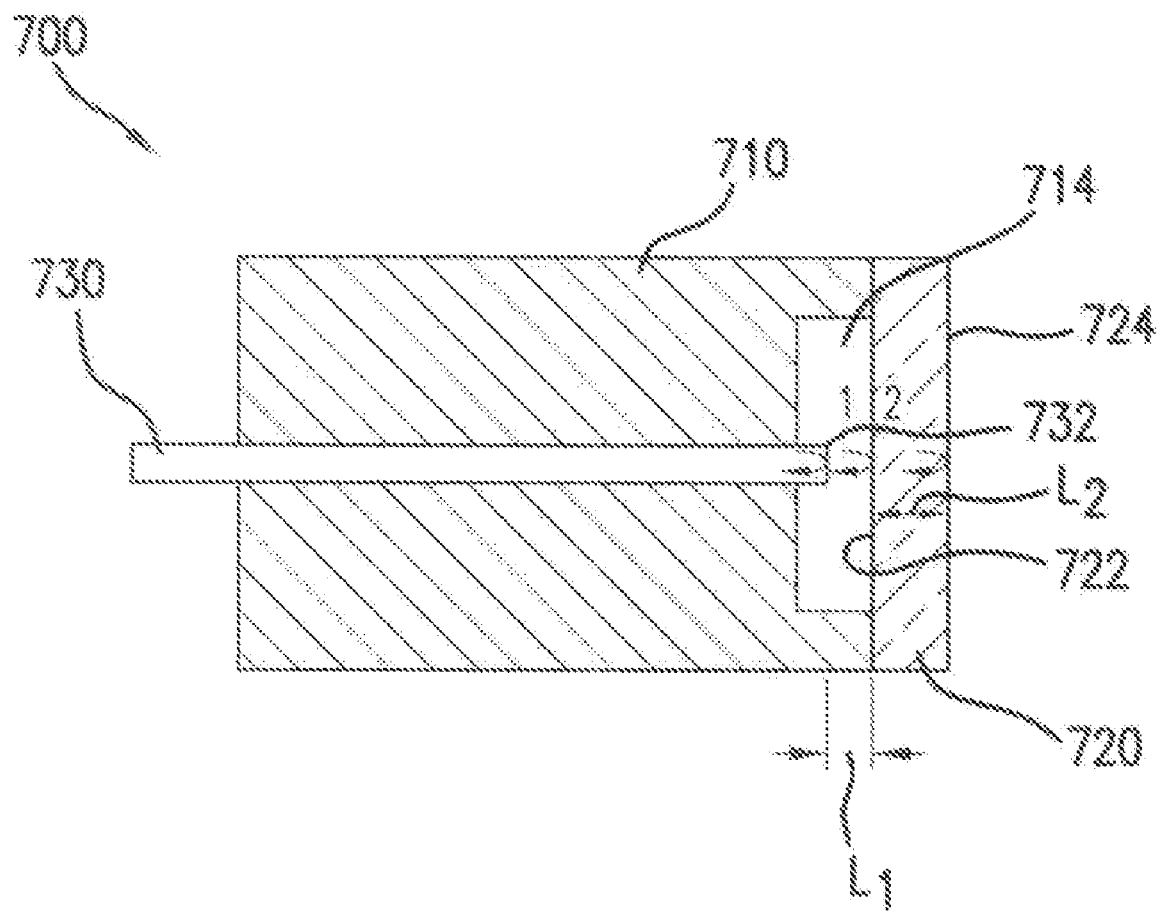
FIG. 6 is a cross sectional view of a diaphragm sensor according to a fifth embodiment of the invention.

A sensor 700 that can monitor both temperature and pressure is illustrated in FIG. 6. The sensor 700 differs from the sensor 100 in that the diaphragm 720 is polished on both the inside 722 and the outside 724. This creates a second Fabry-Perot cavity of length $L_2$ (with an optical path length of $L_2 * n_2$ when $n_2$ is the index of refraction of the diaphragm material and is greater than 1) formed by the glass/air interfaces at the front and back of diaphragm 720. However, unlike the first Fabry-Perot cavity of length $L_1$ formed by the end 732 of the fiber 730 and the diaphragm inside surface 722, the second Fabry-Perot cavity changes less due to pressure exerted on the diaphragm 720, but is affected more by temperature changes that cause changes in the index of refraction of the diaphragm 722. If the optical path lengths of the two Fabry-Perot cavities are chosen to be different, then the responses from the two cavities will yield signals with different frequencies in the optical frequency domain. For example, if the optical path length of the cavity in the diaphragm 720 is larger than the optical path length of the first Fabry-Perot cavity, the interference signal from the second Fabry-Perot cavity of the diaphragm 720 will have a higher frequency than the interference signal from the first Fabry-Perot cavity. These signals with different frequencies can be easily separated by electronic or digital band-pass filters centered at different frequencies or simply by taking the Fourier transform of the return signal. Thus, the sensor 700 can measure both temperature and pressure at the same time. Furthermore, the temperature measurement can be used to compensate the pressure reading for temperature dependence, and vice versa.

The sensor 700 includes a ferrule 710 in which a pit 714 is formed. However, the temperature measurement technique using the second Fabry-Perot cavity formed by a double-polished diaphragm can be utilized in sensors in which the pit is formed in the diaphragm or created using a ring spacer between the ferrule and the diaphragm.

Those of skill in the art will recognize that the diaphragm sensors described herein are applicable to a wide variety of interferometric sensor systems including, but not limited to, linear interferometric sensor systems. In preferred embodiments of the invention, the diaphragm sensors described herein are incorporated into Self-Calibrated, Interferometric, Intensity-Based (SCIIB) sensor systems such as those disclosed in U.S. Pat. No. 6,069,686, and, more preferably still, into Q-point stabilized SCIIB sensor systems such as those disclosed in U.S. patent application Ser. No. 10/670,457, entitled "Active Q-Point Stabilization for Linear Interferometric Sensor,". The contents of both this patent and this patent application are hereby incorporated by reference herein.

While the invention has been described with respect to certain specific embodiments of diaphragm sensors, it will be appreciated that many modifications and changes may be made by those skilled in the art without departing from the spirit of the invention. It is intended therefore, by the appended claims to cover all such modifications and changes as fall within the true spirit and scope of the invention.

What is claimed is:

1. A sensor comprising:
a ferrule, the ferrule having a bore formed therein, the ferrule having an end;
a diaphragm attached to the ferrule, the diaphragm having an inside reflecting surface facing the end of the ferrule;
a first optical fiber within the bore, the optical fiber having a first end;
a second optical fiber, the second optical fiber having a first end and a second end, the first end of the second optical fiber being attached to the first end of the first optical fiber, the second end of the second optical fiber being spaced apart from the inside reflecting surface of the diaphragm, the second end of the second optical fiber and the inside reflecting surface of the diaphragm forming a Fabry-Perot cavity;
wherein the first optical fiber has a first coefficient of thermal expansion; the second optical fiber has a second coefficient of thermal expansion, and the ferrule has a third coefficient of thermal expansion, the second coefficient of thermal expansion being selected to compensate for a difference between the first and third coefficients of thermal expansion.

2. The sensor of claim 1, wherein a pit is formed in the ferrule.

3. The sensor of claim 1, wherein a pit is formed in the diaphragm.

4. The sensor of claim 1, further comprising a spacer disposed between the diaphragm and the ferrule, the spacer having an opening formed therein.

5. A sensor comprising:
a ferrule, the ferrule having an end, the ferrule having a bore formed therein;
a diaphragm attached to the ferrule, the diaphragm having an inside reflecting surface facing the end of the ferrule, at least a portion of the reflecting surface being spaced apart from the end of the ferrule;
a first optical fiber within the bore, the optical fiber having a first end;
a second optical fiber, the second optical fiber having a first end and a second end, the first end of the second optical fiber being attached to the first end of the first optical fiber, the second end of the second optical fiber being spaced apart from the inside reflecting surface of the diaphragm to form a recess, the second end of the second optical fiber and the inside reflecting surface of the diaphragm forming a Fabry-Perot cavity;
wherein the second optical fiber has a coefficient of thermal expansion that compensates for deflection of the diaphragm caused by expansion of air in the recess as the sensor is heated.

6. The sensor of claim 5, wherein a pit is formed in the ferrule.

7. The sensor of claim 5, wherein a pit is formed in the diaphragm.

8. The sensor of claim 5, further comprising a spacer disposed between the diaphragm and the ferrule, the spacer having an opening formed therein.

9. A method for manufacturing a sensor comprising the steps of:
attaching a diaphragm to a ferrule;
inserting an optical fiber into the ferrule such that and end of the optical fiber is spaced apart from the diaphragm by a first distance different from a desired distance; and
welding the ferrule to the optical fiber with a laser;
wherein at least one parameter of the laser is controlled such that a distance from the end of the optical fiber and to the diaphragm changes from the first distance to the desired distance during the welding step.

10. The method of claim 9, wherein the at least one parameter is a peak power of the laser.

11. The method of claim 9, where the at least one parameter is a pulse width of the laser.

12. The method of claim 9, wherein both a peak power and a pulse width of the laser are controlled.

13. The method of claim 9, further comprising the steps of inputting light to the optical fiber and monitoring interference in reflections of the light from the end of the fiber and the diaphragm during the inserting step.

14. The method of claim 9, further comprising the steps of:
inputting light to the optical fiber during the welding step;
converting light received from the sensor to an electrical signal, the light received from the sensor including interfering reflections from the end of the fiber and the diaphragm; and
inputting the electrical signal to a feedback circuit configured to control the at least one parameter of the laser.

* * * * *